No. 648,009. Patented Apr. 24, 1900.
H. O. WESTENDARP.
MAXIMUM METER.
(Application filed Feb. 28, 1900.)
(No Model.)
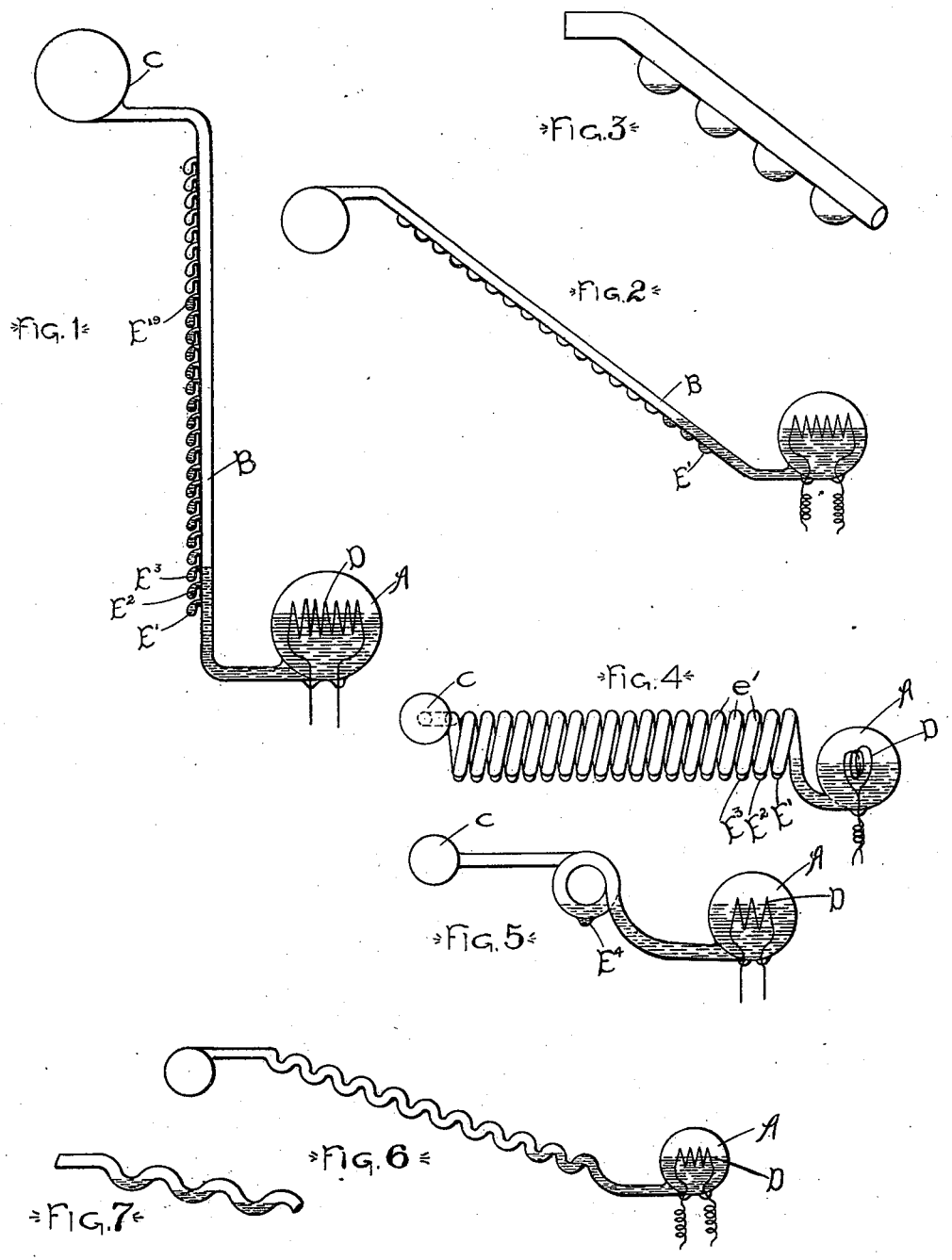
Witnesses
Inventor
Henry O. Westendarp
by Albert G. Davis, Atty.

UNITED STATES PATENT OFFICE.

HENRY O. WESTENDARP, OF SAUGUS, MASSACHUSETTS, ASSIGNOR TO THE GENERAL ELECTRIC COMPANY, OF NEW YORK.

MAXIMUM-METER.

SPECIFICATION forming part of Letters Patent No. 648,009, dated April 24, 1900.

Application filed February 28, 1900. Serial No. 6,797. (No model.)

*To all whom it may concern:*

Be it known that I, HENRY O. WESTENDARP, a citizen of the United States, residing at Saugus, county of Essex, State of Massachusetts, have invented certain new and useful Improvements in Maximum-Meters, (Case No. 1,329,) of which the following is a specification.

My invention relates to instruments designed to record maxima, and particularly to instruments for recording the maximum value of an electric current during a predetermined time, though in some of its aspects it is susceptible of other applications.

In the drawings attached to this specification, Figure 1 is an elevation of my improved meter in one form. Fig. 2 represents a modification. Fig. 3 is an enlarged detail of a portion of Fig. 2. Figs. 4 and 5 are respectively side and end elevations of a modified form. Fig. 6 represents a still further modification, and Fig. 7 is an enlarged detail of Fig. 6.

Referring more particularly to Fig. 1, it will be seen that my improved meter comprises a heating-chamber A, a connecting-tube B, and a bulb or compression-chamber C. The chamber A is partly filled with liquid—as, for example, colored water—and in operative relation with this chamber is placed a coil D, which is so connected as to carry the current to be measured or a current corresponding thereto.

The compression-chamber C contains air or other gas at suitable pressure, and the arrangement is such that as the gas in A is expanded by the heating effect of the current in the coil D the liquid may be caused to rise in the tube B. This action may be increased by the vapor tension due to the particular liquid used; but it is possible to rely entirely upon the action of the gas.

It will be seen that a number of pockets $E'$ $E^2$, &c., are connected to the tube B in such a way that the liquid in rising in the tube must successively fill these pockets.

The operation of the device is as follows: Current passes through the coil D either in series with the mains, in shunt to a definite resistance in series with the mains, or in any other well-known manner and heats the coil D. This causes the fluid to rise in the tube B and to successively fill the pockets $E'$ $E^2$ $E^3$, &c. This action takes place as long as the current rises in value and for a certain definite time thereafter until a steady condition has been reached. If now the current decreases in value, the liquid will recede; but a certain amount of liquid will be left in the pockets $E'$ $E^2$, &c., so that it will be possible to determine from an inspection of these pockets how far the liquid has risen. For example, in the case shown the liquid stands at the level of the pocket $E^3$; but the pockets have been filled up to and including that lettered $E^{19}$, which may show, for example, that nineteen amperes is the maximum load on the branch of the system responsive to that particular meter since the last inspection.

The meter may be inspected and read once a month, and at that time it should be thrown over in such a way that the liquid will run out of the pockets $E^{19}$, and the liquid should then be collected in the chamber A, as will be well understood.

The form shown in Figs. 2 and 3 differs from the form shown in Fig. 1 in that the tube B is inclined, which makes it possible to simplify the construction of the pockets.

In the form shown in Figs. 4 and 5 the tube B is spiral and is provided with pockets $E'$, &c., which are placed along its lower edge. In this form an increased pressure furnishes the force necessary for causing the front portion of the column of liquid to rise sufficiently to pass around one spiral, thus depositing liquid in one of the tubes $e'$. If the pressure in A is reduced, the pressure in C will tend to cause the liquid to run back; but some will be caught in the pockets $E'$, &c.

The form shown in Figs. 6 and 7 differs from those above mentioned in the respect that the pockets are mere bends in the tube, as may readily be seen from inspection of the drawings. This form is very simple and may be constructed at low cost. It may be reset at inspection by merely swinging it around an axis to a vertical position.

The error due to changes in external temperature is reduced by causing the volume of the chamber C plus the volume of the empty portion of the tube B to equal the volume of the bulb A above the fluid. As the last two quantities vary at different readings, exact correction is not possible; but I have attempted in Fig. 4 to indicate that these proportions should be approximated as nearly as may be.

What I claim as new, and desire to secure by Letters Patent of the United States, is—

1. In a maximum-indicating device, the combination with a fluid responsive to an indication to be recorded, of a series of pockets for holding and retaining said fluid.

2. In a maximum-indicating device, the combination with a fluid responsive to an indication to be recorded, of a series of pockets for holding and retaining said fluid, each corresponding to a certain indication.

3. In a maximum electric meter, the combination with a heating-coil responsive to the function of current to be measured, of a liquid forced to move by the action of said coil, a tube in which the liquid moves, and a series of pockets for holding and retaining the liquid.

4. A maximum electric recording device, consisting of a heating-chamber containing an expansive substance, a heating-coil in operative relation thereto, a compression-chamber, and a bent tube rising from the heating-chamber to the compression-chamber and affording a series of pockets, whereby the pockets formed by the bends of the tube may serve to hold and retain the liquid, and thus preserve an indication of the maximum height of said liquid and of the maximum reading of the instrument.

In witness whereof I have hereunto set my hand this 20th day of February, 1900.

HENRY O. WESTENDARP.

Witnesses:
DUGALD McKILLOP,
CHARLES B. BETHUNE.